Jan. 11, 1949. W. L. LEWIS ET AL 2,458,788
JIG FOR ASSEMBLING HOLLOW STRUCTURES
Filed Jan. 18, 1943 6 Sheets-Sheet 1

INVENTORS
WILLIAM L. LEWIS
FREDERIC C. PAHL
BY HARRIS, KIECH, FOSTER & HARRIS
FOR THE FIRM
ATTORNEYS

Jan. 11, 1949.  W. L. LEWIS ET AL  2,458,788
JIG FOR ASSEMBLING HOLLOW STRUCTURES
Filed Jan. 18, 1943  6 Sheets-Sheet 2

INVENTORS
WILLIAM L. LEWIS
FREDERIC C. PAHL
BY HARRIS, KIECH, FOSTER & HARRIS
FOR THE FIRM
ATTORNEYS

Patented Jan. 11, 1949

2,458,788

UNITED STATES PATENT OFFICE 2,458,788

JIG FOR ASSEMBLING HOLLOW STRUCTURES

William L. Lewis, Glendale, and Frederic C. Pahl, Culver City, Calif.; said Pahl assignor to Hughes Tool Company, Houston, Tex., a corporation of Delaware Application January 18, 1943, Serial No. 472,804

2 Claims. (Cl. 144—281)

Our invention relates to procedures for assembling and fabricating structures, with special reference to hollow structures having wall material in sheet or plate form reinforced by frame members extending along the inner or outer surface of the wall material. The invention is directed to a means and a method for properly positioning or assembling the various parts of the structure and for uniting the structurally related parts.

For the purpose of disclosure, our invention is described herein as applied to the fabrication of certain airplane parts, with special reference to monocoque construction, but it will be apparent that the invention is likewise applicable to the building of other structures including vehicle bodies, boats, and the like. Our description is also directed specifically to so-called "plastic" construction in which construction the material employed may include laminated wood, impregnated wood, or various plastics, the parts being united by suitable glue or plastic cement. It will be noted, however, that certain features of the invention have utility in solving assembly problems regardless of the materials used and regardless of the methods of uniting the parts.

The general object of the invention is to provide a method and means for positioning structural parts, for example, frame members and sheet material, in positions for assembly and to provide a method and means for subsequently applying pressure or pressure and heat to unite the positioned structural parts.

Various expedients have been employed in the prior art to locate and temporarily fix frame members to receive sheet material. In the present invention as applied to this task we propose to provide a novel jig or mandrel assembly having important advantages over the prior art expedients. Some of the objects of our new procedure, with special reference to the employment of such a mandrel assembly, include the following: to provide a mandrel assembly that will afford efficient internal support for a hollow grouping of frame members and sheet material; to provide a mandrel assembly that may be readily withdrawn after the frame members and sheet material are united; to provide a mandrel assembly that will adequately support an exceptionally long tubular shell and yet permit continuous circumferential frame members or frame rings to be slipped over the mandrel assembly for distribution to assembly positions; to provide a mandrel assembly that may be readily built up or expanded for internal bracing of surrounding circumferential frame members and yet be contracted or collapsed for subsequent withdrawal; to provide a mandrel assembly that includes at least one key element, which element or elements may be withdrawn longitudinally to cause the mandrel assembly to contract or collapse for subsequent removal; to provide a mandrel assembly of separate elements designed to be held together by temporary connections until circumferential frame members are positioned thereon and thereafter to be held together solely by compression on the part of the circumferential frame members, whereby the temporary connections may be removed to permit subsequent withdrawal of the elements individually; to provide a mandrel assembly with the foregoing features that may be rotated about its longitudinal axis for the convenience of craftsmen; and to provide such a mandrel assembly in combination with jig attachments whereby fittings may be located or assembled on a completed hollow body before the hollow body is removed from the mandrel assembly.

When glue of the type satisfactory for this work is used to unite structural parts, pressure must be applied within a short period of time after the glue is deposited on the surfaces to be joined. If the glue is thermal setting, both pressure and heat may be applied within the time interval. Heretofore the prevalent method of pressing sheet material against an assemblage of frame members, to cause the parts to unite by the setting of intervening glue, has been to apply straps or girth members to the sheet material, the required pressure being obtained by placing the straps or girth members under tension. Serious disadvantages are inherent in such a method. The tightening of the friction means to attain the required pressure is so time-consuming that a relatively extensive shell with a relatively large number of frame members cannot be prepared for the gluing operation within the time limit imposed by the glue. The placing of the straps or girth members under tension affords no information about the amount of radial pressure produced. Because of friction a strap or girth member tends when tightened to create circumferential stresses in a manner to distort the assembly. Likewise because of friction between the strap or girth member and the sheet material the pressure exerted may not be uniform around the periphery of the assembly. If the hollow body that is being constructed is oval or elliptical in cross section, a strap or girth member cannot act to apply uniform radial pressure against the sheet material. It is well known that straps or girth members of the type usually employed tend to expand with increasing temperature and consequently reduce the radial pressure against the sheet material when heat is applied to set the glue. A further disadvantage is that once an assembly equipped with straps or girth members is placed in a heating chamber or autoclave, no adjustments may be made thereafter to regulate the radial pressure against the sheet material by the straps or girth members.

We propose to avoid these disadvantages by mounting pressure members adjacent the sheet material and then placing fluid pressure expansile means between the pressure members and the sheet material to expand and thereby exert pressure against the sheet material. The objects of our invention with respect to such a pressure procedure include the following: to provide a pressure member in combination with an expansile fluid duct thereby to apply localized pressure against the underlying sheet material; to provide such a combination in which the expansile duct conforms to the pattern of frame members against which pressure is exerted; to provide a combination of numerous pressure members and expansile ducts all of which may be made effective easily within the time limit imposed by the properties of the glue employed; to provide such a combination in the form of a split ring that may be quickly mounted over a sheet metal shell; to provide such a combination for exerting substantially uniform circumferential pressure against a non-circular shell; to provide such a combination for use in a heating chamber together with means for indicating and controlling the applied pressure from a point outside the chamber; to provide such a combination in which the fluid for applying pressure is heated for heat transfer to the glue, thereby to avoid the necessity of using a heating chamber; to incorporate in such a combination an electric heating element conforming to the pattern of the glue as an alternative arrangement for avoiding the necessity of using a heating chamber.

Further objects and advantages of our invention including objects relating to special problems involved in fabricating conical hollow bodies will be apparent in the following detailed description, taken with the accompanying drawings.

In the drawings, which are to be considered as illustrative only.

Figs. 1 to 13 relate to the construction of a boom for an aircraft of a well known type having two such booms spaced on opposite sides of the fuselage to support rearward tail structure. It is apparent from the figures that the boom is elliptical or oval in general cross-sectional configuration and tapers from its forward end to a rear portion that extends laterally for juncture with the tail structure of the airplane.

Figure 1:
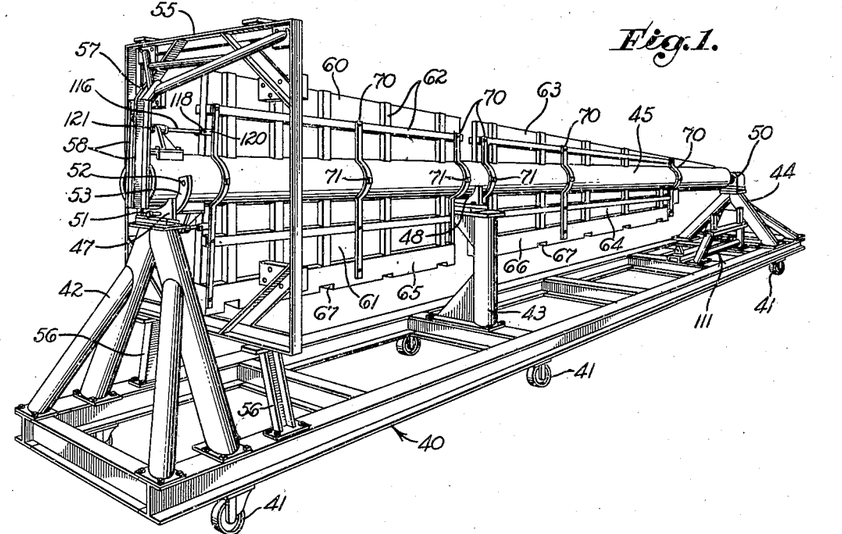
Fig. 1 is a perspective view of the partially assembled mandrel assembly together with supporting structure.
Figure 5:
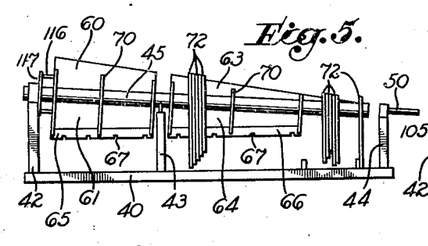
Figs. 5 to 13 are diagrammatic views in side elevation illustrating successive steps in one practice of our invention.
Figure 6:
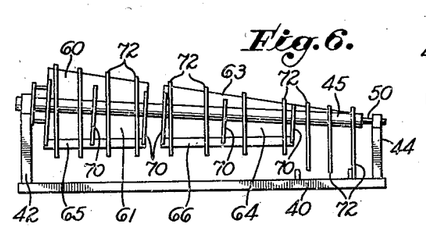

Figs. 1 and 5 illustrating an early stage in the fabricating procedure show a mandrel assembly that is partially assembled as required for initially receiving frame members of the boom. The construction includes a base frame 40 that is mounted on suitable casters 41 and carries three removable pedestals or standards, a forward standard 42, an intermediate standard 43, and a rear standard 44, the purpose of the standards being to rotatably support an axial core 45. The core 45 is preferably of tubular construction and may be rotatably seated in cradles 47 and 48 on the forward and intermediate standards 42 and 43, respectively, and may be rotatably supported at its rear end by a short shaft 50. The shaft 50 retractably extends forward from the rear standard 44 into a suitable bearing socket (not shown) in the end of the core 45. In the construction shown, the core may be latched against rotation at selected positions by means of a headed pin 51 that is slidingly mounted in the forward standard 42 to selectively engage holes 52 in a radial flange 53 on the axial core.

Various jigs and fixtures may be added to the structure as desired. Fig. 1 shows a forward jig 55 in the form of a rectangular frame that is removably mounted on the base frame 40 by legs 56 and is further supported by an arm 57, the arm being held in proper position by a pair of spaced parallel angle-irons 58 on the forward end of the core 45.

Figs. 1 and 5 show certain elements of the mandrel assembly that are initially mounted on the core 45 to complete the major portion of the vertical dimension of the assembly. These elements include two diametrically opposite longitudinal elements 60 and 61 which may comprise plates of wood reinforced or thickened by vertical and horizontal ribs 62. In the present arrangement these two longitudinal elements are intended to be retractable, and since they are preferably tapered in longitudinal configuration to favor such withdrawal they will for convenience be referred to as the tapered elements 60 and 61 of the mandrel assembly. The tapered elements 60 and 61 terminate short of the intermediate standard 43 to provide clearance for that standard. To continue the desired configuration of the mandrel assembly between the intermediate standard 43 and the rear standard 44 we provide a second pair of tapered elements 63 and 64 conforming in position and configuration to the tapered elements 60 and 61.

On the lower edges of the tapered elements 61 and 64, respectively, we place longitudinal mandrel elements 65 and 66 provided with suitable recesses 67 for positioning and retaining circumferential frame members of the boom structure. To hold this initial assembly of elements together, suitable temporary fastening expedients may be employed. In our preferred practice we use a series of metal straps 70 on opposite sides of the core 45, the metal straps being shaped to conform to the core and being temporarily secured by various bolts 71 that extend through the core and through the associated elements.

An early step in the procedure is to disengage the rear standard 44 from the core 45 by retraction of the shaft 50 to permit circumferential frame members or rings 72 of the desired boom structure to be slipped over the smaller end of the mandrel assembly, as shown in Fig. 5. At this time the core 45 is supported by the forward standard 42 and the intermediate standard 43. The rear standard 44 is then again engaged with the core 45 by replacement of the shaft 50, and the intermediate standard 43 is removed to permit the circumferential frame members 72 to be distributed to positions indicated by the recesses 67, the various parts then being in the positions indicated in Fig. 6.

Figure 7:
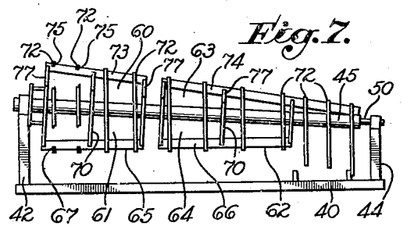
Figure 8:
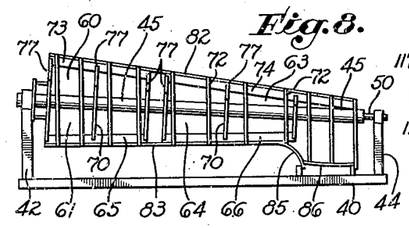

The next step consists of adding to the assembly longitudinal mandrel elements 73 and 74 that are positioned on the upper edges, respectively, of the tapered elements 60 and 63 to complete the vertical dimension of the mandrel assembly, these longitudinal elements 73 and 74 being provided with recesses 75 corresponding to the previously mentioned recesses 67. Fig. 7 has two of the forward circumferential frame members 72 broken away to show how the recesses 67 engage the rings at lower points and how the recesses 75 engage the rings at upper points. The forward circumferential frame members or rings 72 on the uniformly tapered portion of the boom are thus anchored in place, while three rearward circumferential frame members designed for co-operation with the tail structure of the airplane at this time merely hang in the recesses 75. The longitudinal elements 73 and 74 are moved into the desired positions by first inserting them longitudinally alongside the core 45 inside the circumferential rings 72, and then moving them laterally upward and rotating them into place. To secure them in position, suitable supplemental straps 77 and additional bolts 78 may be employed, as best shown in Fig. 2.

Figure 2:
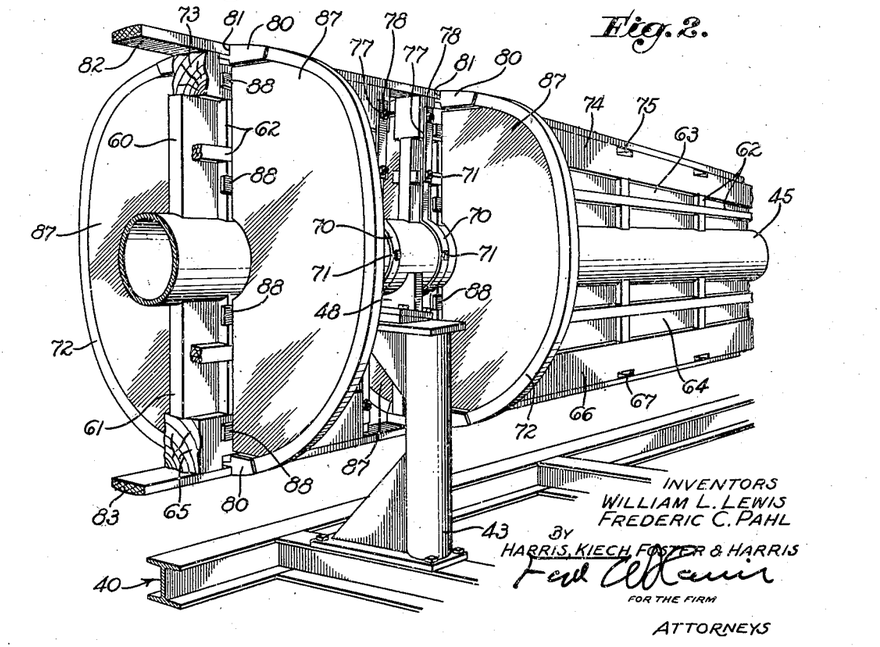
Fig. 2 is a similar view on a larger scale of the mandrel assembly at a more advanced stage of assembly, only the forward portion of the assembly being shown.

Each of the circumferential frame members or rings 72 of the boom is thickened in radial dimension in the regions of the upper recesses 67 and again in the regions of the lower recesses 75, and in each of these regions is reinforced on each face by a small plate 80, as best shown in Fig. 2. In these reinforced regions of the upper recesses 75 and the lower recesses 67 the rings 72 extend radially outward from the recesses 75 and 67, and the protruding portions of the rings are in turn cut away to provide longitudinally aligned recesses 81. The purpose of these ring aligned recesses is to receive an upper longitudinal frame member 82 and to receive a lower longitudinal frame member 83, which frame members are to be structural parts of the completed boom. These longitudinal frame members 82 and 83 may be simply nailed or otherwise mechanically attached to the rings 72 of the boom. As may be noted in Figs. 8 and 9, the lower longitudinal frame member 83 terminates in a downwardly curved portion 85 that is connected to a rearwardly extending member 86. The rearward member serves both the purpose of a longeron and the purpose of a plate to receive fittings by which the boom is to be attached to the tail structure of the airplane. The member 83 is mechanically connected to the three rearward rings 72.

The next step in the procedure of building up the mandrel assembly is to add a plurality of elements to complete the assembly in a second dimension, the second dimension being horizontal in Fig. 2. A feature of our invention is the concept that this additional plurality of elements of the mandrel assembly may be so expanded outwardly against the various boom rings 72 as to cause the whole mandrel assembly to be held in place solely by compression from the rings. When such a condition is achieved, the various metal straps 70 and 77, together with the associated bolts 71 and 78, may be removed, thereby making it possible subsequently to withdraw various elements of the mandrel assembly individually after the fabrication procedure is completed.

Figure 15:
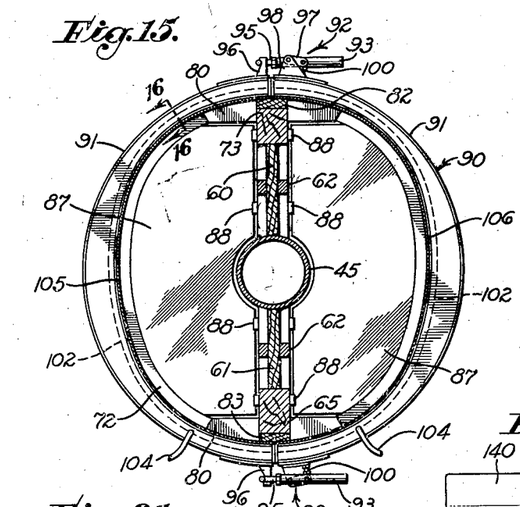
Fig. 15 is a cross-sectional view showing means surrounding the mandrel assembly to press sheet material radially inward against frame members on the assembly.

As best shown in Fig. 2, the additional plurality of elements for building up the second dimension of the mandrel assembly in the desired manner may consist of a series of plates 87 generally semi-circular in configuration together with a series of small wedges 88. The plates 87, which are cut to conform to the boom rings 72, are placed inside the boom rings as indicated in Figs. 2 and 15, and are secured in place by the small wedges 88. The various wedges 88 are driven between the inner edges of the plates and the adjacent surfaces of the various tapered elements 60, 61, 63, and 64 and also between the inner edges of the plates and the adjacent surfaces of the longitudinal mandrel elements 65, 66, 73, and 74. It is important to note that all of the small wedges 88 are pointed in the same direction as the tapering of the associated tapered elements so that withdrawal of the tapered elements at the end of the fabricating procedure will act to retract the small wedges and thereby loosen the semi-circular plates 87. The expanding action on the mandrel assembly achieved by inserting the small wedges 88 is sufficient to place the mandrel assembly under considerable compression by the surrounding boom ring 72 so that the metal straps 70 and the supplemental straps 77 may now be removed.

Now that all the circumferential and longitudinal frame members of the boom structure are rigidly fixed in their proper positions for assembly, the next step is to apply glue to the frame members at all surfaces of juncture with the boom shell and then to apply sheet material to the frame members with suitable pressure, the pressure being sustained during the period in which the glue sets. It is apparent that the described mandrel assembly has utility in itself and may be employed with various expedients old and new for placing the sheet material under pressure. In our preferred practice, however, we employ pressure members adjacent the sheet material in combination with fluid pressure means between the pressure members and the sheet material, the fluid pressure means being expansile to create the required pressure against the sheet material.

Figure 3:
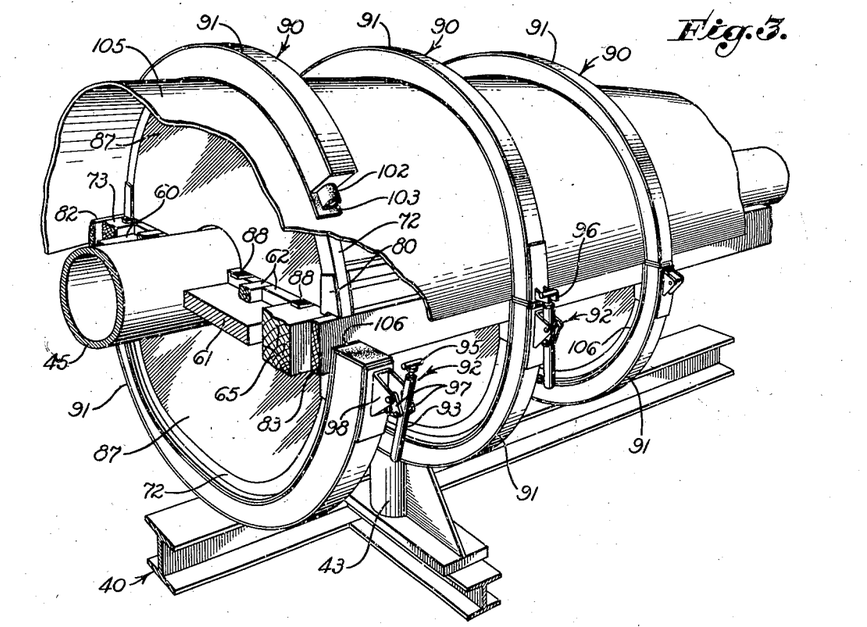
Fig. 3 is a similar view showing sheet material in the process of being clamped around the mandrel assembly.
Figure 16:
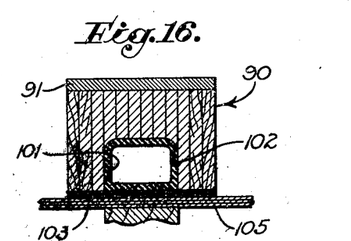
Fig. 16 is an enlarged fragmentary section taken as indicated by the line 16—16 of Fig. 15.

Such a combination of pressure member and expansile means may, as best shown in Figs. 3, 15, and 16, be in the form of a pressure ring or girth member generally designated 90 that is of split construction so that it may be opened and moved laterally into engagement with the assembly. In our preferred construction each of the split rings 90 is made in two sections 91, which section may be pivotally interconnected in any suitable manner. In the present arrangement the sections are interconnected by two quick-acting latches generally designated 92.

Each of the quick-acting latches 92 includes a toggle lever 93 on one of the sections 91 in the form of a handle having a T-shaped extension 95 to engage a pair of latch ears 96, the latch ears being on the other of the two sections 91. The toggle lever 93 is connected by a pair of toggle links 97 to a pair of brackets 98, the arrangement being such that the closing action of the toggle lever 93 carries the two links past center into contact with an adjustable stop screw 100. When the two sections 91, making up one of the pressure rings 90, are in proper position registering with each other, they may be quickly interconnected by engaging and throwing the toggle levers 93.

As shown in cross section in Fig. 16, the pressure rings or girth members 90 may be constructed of laminated wood and formed with inner circumferential grooves or recesses 101 in which are placed expansile ducts 102 of rubber or other suitable material. Each duct 102 has a supply tube 104 (Fig. 15) and each duct lies against a liner 103 of suitable flexible material that extends around the inner circumference of the pressure ring. The liner 103 serves to keep the duct 102 in place and yet permits the duct to expand inwardly toward the axis of the pressure ring 90. A liner 103 of woven fabric instead of rubber or the like is preferred for embracing a shell of conical or tapering configuration, since a girth member compressing a shell of such configuration tends to move in the direction of the shell taper and woven material resists this tendency to an effective degree.

The sheet material for forming the shell of the boom may be preformed or not and may either be initially applied to form the entire shell or may be initially applied in part. In our preferred practice the sheet material is preformed into what may be termed semi-cylindrical shell sections and one of the two shell sections is completely assembled and bonded before the other shell section is applied.

Figure 9:
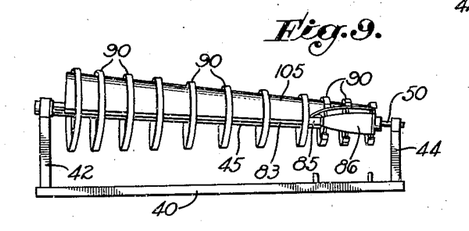

In the present procedure, let it be assumed that thermal-setting glue is employed, in which event the sheet material must be subject both to sustained pressure and sustained heat within about thirty minutes from the time that the glue is initially distributed over the juncture surfaces. After the glue is so distributed, one shell section 105 is applied as indicated in Figs. 3 and 9, the mandrel assembly being rotated 90° from its initial position so that the shell section may be simply dropped onto the mandrel assembly. After the shell section is in place, the various pressure rings 90 are mounted as shown, each pressure ring being in the radial plane of one of the circumferential frame members or rings 72. Since the pressure rings or girth members 90 have an internal diameter substantially equal to the outside diameter of the completed boom and since at this stage one-half of the boom shell is lacking, suitable spacer strips 106 (Fig. 3) are inserted between the pressure rings and the frame rings in substitution for the missing shell sections.

The mandrel assembly, together with the boom structure, completed to the point indicated in Figs. 3 and 9, is now moved into a suitable heating chamber to raise the temperature of the applied glue; and then fluid, for example, air under pressure, is introduced into the expansile ducts 102 by means of supply tubes 104 for the purpose of compressing the sheet material, i. e. the shell section 105, against the underlying circumferential frame members or rings 72. After a suitable period of time the glue sets and the assemblage is rolled out of the heating chamber for the performance of further steps in the fabricating procedure. Either at this time or before the assemblage is initially placed in the heating chamber, the edges of the shell section 105 may be nailed or otherwise mechanically attached to the underlying longitudinal frame members 82 and 83.

Figure 10:
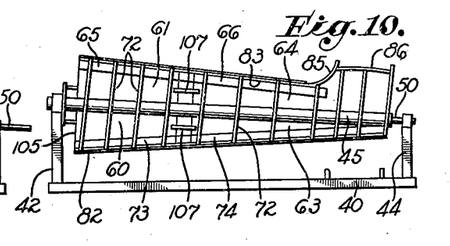
Figure 11:
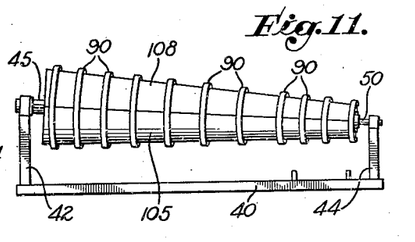

The mandrel assembly may now be rotated to its original position to make the interior conveniently accessible as shown in Fig. 10, and suitable connecting members 107 are employed to interconnect the upper tapered elements 60 and 63 and to interconnect the lower tapered members 61 and 64. It is apparent that this operation of interconnecting the tapered elements may be performed any time after the metal straps 70 and the supplemental straps 77 are removed.

The pressure rings 90 are now removed to permit the remaining peripheral surfaces of the circumferential frame members 72 to be coated with glue and to permit a second shell section 108 to be added, thereby to complete the shell of the boom. To receive the second shell section 108, the mandrel assembly is rotated to place the first shell section 105 on the underside and thereby permit the second shell section to be added from above. When the second shell section 108 is in place, the pressure rings 90 are again distributed on the assemblage in positions corresponding to the concealed circumferential frame members 72 and again the assemblage is moved into the heating chamber for heat and pressure treatment, the pressure being applied by introducing fluid into the ducts 102.

Figure 4:
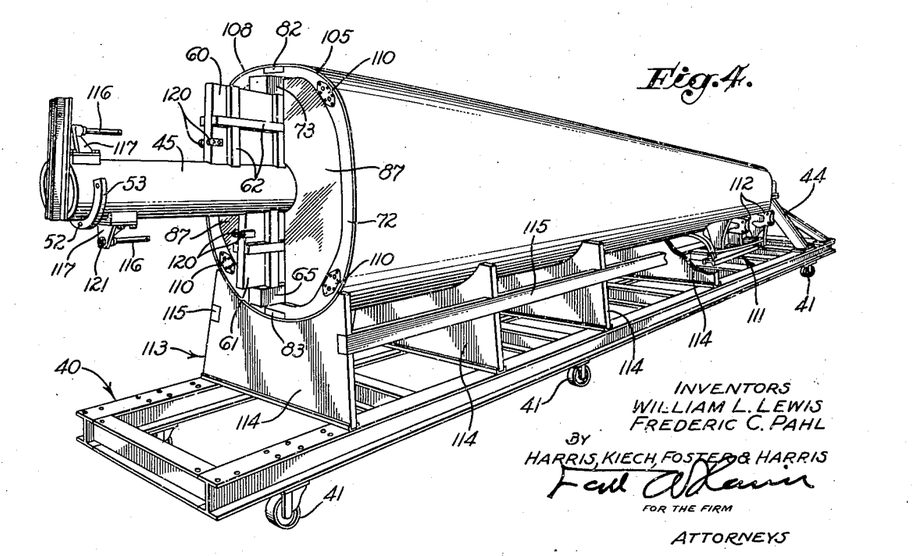
Fig. 4 is a full range perspective view similar to Fig. 1 showing the hollow structure completed and illustrating the initial steps in the removal of the mandrel assembly.

When the assemblage is taken from the heating chamber the second time, the pressure rings 90 are removed and the second shell section 108 is nailed or otherwise attached to the underlying longitudinal frame members 82 and 83. The mandrel assembly may then be rotated to its initial position and the forward jig 55 mounted in place to locate holes for forward fixtures 110 (Fig. 4). At this time other jig accessories may be employed, such as the jig generally designated 111 in Figs. 1 and 4, this second jig being used to locate fixtures 112 that are to be later associated with the tail structure of the airplane.

Figure 12:
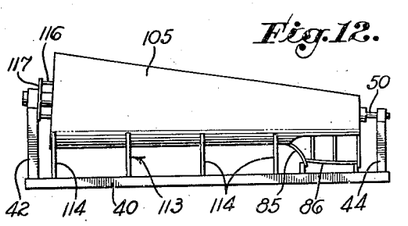

The next task is to remove the completed boom structure. In preparation for this task, the weight of the assemblage is transferred to a cradle generally designated 113 which comprises a series of transverse plates 114 of wood interconnected by timbers 115. After the weight of the structure is transferred to the cradle as indicated in Fig. 12, steps are taken to cause the mandrel assembly to contract or collapse to permit withdrawal of the separate elements of the mandrel assembly. In our preferred arrangement we provide two special pull rods 116 that are mounted by brackets 117 on the mandrel core 45, there being one pull rod for the upper tapered element 60 and a second pull rod for the lower tapered element 61 of the mandrel assembly. Each of the pull rods 116 is adapted to be attached to the corresponding tapered element by a cross pin 118 (Fig. 1) that removably extends through a pair of ears 120 on the end of the tapered element. Each pull rod is slidably mounted in the corresponding bracket 117 and is extensively threaded to receive a suitable nut 121 on the outer side of the bracket. When the pull rods 116 are connected to the tapered elements 60 and 61 of the mandrel assembly, the tapered elements may be withdrawn sufficiently to loosen the whole mandrel assembly by the simple procedure of screwing the nuts onto the pull rod, thereby shifting the pull rods longitudinally outward.

Figure 13:
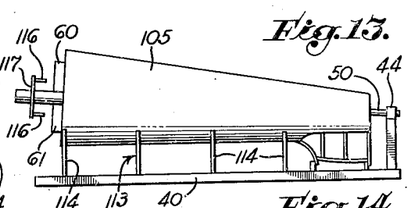

After the pull rods 116 have loosened the tapered elements 60 and 61, as indicated in Fig. 13, the tapered elements may be freely withdrawn. Fig. 4 shows the two tapered elements withdrawn to such an extent as to loosen the grip of the mandrel assembly on the core 45 so that the core may be withdrawn. In Fig. 4 the core is in the initial stages of being so withdrawn. It is to be noted that the forward tapered elements 60 and 61 are connected, respectively, to the corresponding rearward tapered elements 63 and 64 through the previously mentioned connecting members 107 to move in unison. It is also to be noted that the small wedges 88 are pointed in the same direction as the tapered elements 60, 61, 63, and 64 so that withdrawal of the tapered elements tends to loosen the small wedges. It is to be further noted that since the tapered elements participate in both the vertical dimension and the horizontal dimension of the mandrel assembly, complete withdrawal of the tapered elements causes the mandrel assembly to collapse across both dimensions. After such collapse, the elements of the mandrel assembly may be removed individually until finally the completed boom is unencumbered and ready for removal from the cradle 113.

Figure 14:
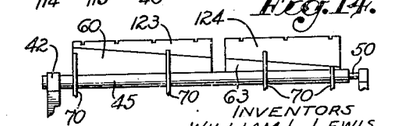
Fig. 14 is a fragmentary view similar to Fig. 5 showing the structure modified for producing a hollow body of cylindrical rather than conical configuration.

The purpose of the diagrammatic Fig. 14 is to indicate how the mandrel assembly may be modified to serve as means for fabricating an extensive cylindrical shell of substantially uniform diameter. It will be noted that the modification consists essentially of substituting longitudinal mandrel elements 123 and 124 for the previously mentioned longitudinal mandrel elements 73 and 74, the substituted longitudinal elements being tapered complementary to the tapered configuration of the underlying tapered elements 60 and 63. In the same manner, tapered longitudinal mandrel elements (not shown) are substituted for the lower tapered elements 65 and 66 of the first described arrangement to build up the required uniform diameter.

The fluid employed in the fluid pressure expansile ducts 102 in the pressure rings 90 may be either gaseous or liquid, and a further feature of our invention is that such fluid may be heated, and, if necessary, circulated through the ducts 102 for the purpose of supplying the heat required in the setting of thermal-setting glue.

Figure 17:
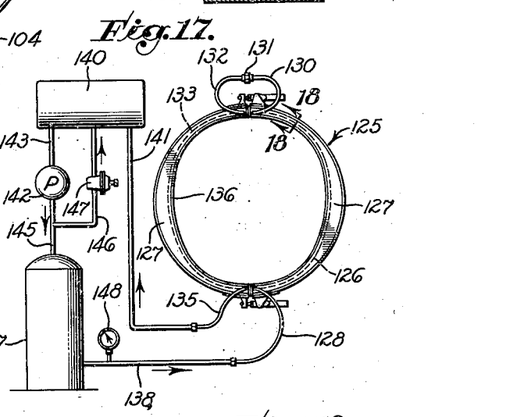
Fig. 17 is a more or less diagrammatic view showing means for circulating heated fluid under pressure through a sheet-clamping means.
Figure 18:
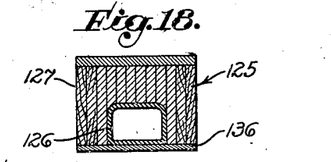
Fig. 18 is a cross section taken as indicated by the line 18—18 of Fig. 17.

In Fig. 17 we show, by way of example, a pressure ring generally designated 125 that is adapted for the circulation of heated fluid. The expansile duct 126 in one of the two sections 127 of the pressure ring 125 has an inlet extension 128 at one end and an outlet extension 130 at the other end. The outlet extension 130 is connected by suitable means 131 to an inlet extension 132 of an expansile duct 133 in the other ring section 127, and this second expansile duct has a discharge extension 135. As indicated in Fig. 18 heat transference from the two expansile ducts 126 and 133 may be facilitated by using a metal liner 136 for the pressure ring instead of the previously described rubber liner.

Any suitable system may be used to heat and circulate fluid through the pressure ring 125. The arrangement shown in Fig. 17 is designed for heating and circulating water. The system includes a boiler or water heater 137 connected by a suitable pipe 138 to the inlet extension 128 of the pressure ring and a low pressure reservoir 140 connected by a pipe 141 to the discharge extension 135 of the pressure ring. A suitable pump 142 draws fluid from the low pressure reservoir 140 through a pipe 143 and delivers the fluid under pressure to the boiler through a pipe 145. A by-pass 146 from the discharge side of the pump to the low pressure reservoir is provided with a pressure regulating valve 147 that permits the fluid to be by-passed in a manner to maintain a predetermined pressure, which pressure may be indicated by a suitable gauge 148.

Figure 19:
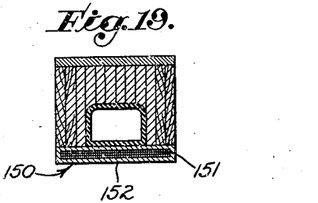
Fig. 19 is a view similar to Fig. 18 illustrating another modified practice of the invention.

Fig. 19 shows a modification of the preferred form of our invention that consists of substituting a heating band 150 for the previously described fabric liner 103 of a pressure ring 90. The heating band 150 comprises an electrical resistance or heating element 151 in an asbestos casing 152 and is designed to supply the heat required for thermal-setting glue. It will be noted that such a heating band conforms to the concealed frame structure to which sheet material is to be bonded.

Figure 20:
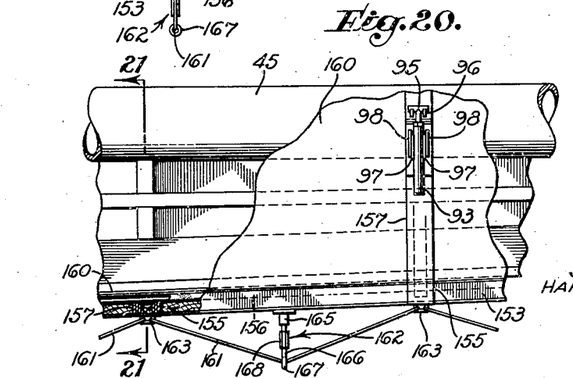
Fig. 20 is a fragmentary view partly in section and partly in side elevation illustrating a modified practice of the invention.
Figure 21:
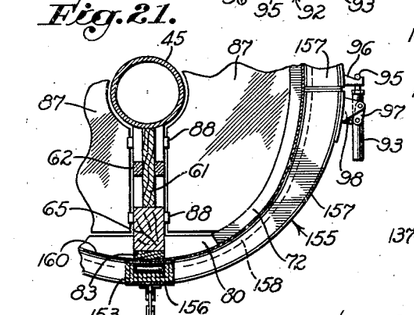
Fig. 21 is a fragmentary cross section taken as indicated by the line 21—21 of Fig. 20.

In the first described practice of our invention the shell sections 105 and 108 are nailed or otherwise mechanically fastened to the underlying longitudinal frame members 82 and 83. The purpose of Figs. 20 and 21 is to indicate how longitudinal pressure members 153 may be employed to bond the sheet material to the longitudinal members by glue. In the arrangement shown in Figs. 20 and 21, special pressure rings 155 are employed, the split ends of which are circumferentially removed from the regions of the previously mentioned longitudinal frame elements 82 and 83. Since the construction is easily understood in view of what has been said before, only the lower longitudinal frame member 83 is shown in the two figures and only the lower portion of the special pressure rings 155. The longitudinal pressure members 153 extend between the pressure rings 155 and house an expansile fluid duct 156 that is common to a whole series of longitudinal pressure members, the duct extending through a suitable recess in each of the pressure rings 155. Each of the two sections 157 of a pressure ring 155 has an expansile fluid duct 158 that is offset to pass around the longitudinal expansile duct as may be understood from the drawings.

Any suitable means may be employed to hold the longitudinal pressure members 153 against the sheet material 160 in a substantially unyielding manner so that expansion of the fluid duct 156 will create the required inward pressure against the sheet material. For example, we may anchor the longitudinal pressure members 153 against outward movement by employing a series of cables 161 in combination with suitable compression devices 162. Each of the cables 161 is connected at its opposite ends to a suitable metal loop 163 on one of the two successive pressure rings 155, and one of the compression devices 162 is mounted midway between the two pressure rings to engage the cable and press against the corresponding pressure member 153. The particular type of compression device illustrated comprises a base 165 and a stem 166 having an eye 167 to engage the cable 161, the stem being adjustable in extent by virtue of a turnbuckle 168. After a compression device 162 is positioned as indicated in Figs. 20 and 21, the turnbuckle 168 may be rotated to place the cable 161 in tension and thereby exert inward pressure on the longitudinal pressure member 153 to whatever degree may be desirable.

Figure 26:
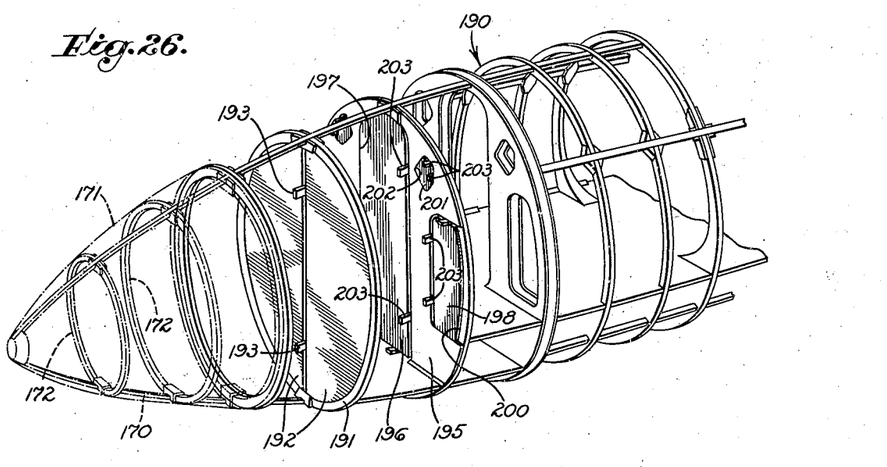
Fig. 26 is a perspective view of a portion of a fuselage frame as prepared for the application of sheets or plates thereto.

Figs. 22 to 25 inclusive indicate how the principles of our invention may be applied to the construction of a conical nose 170 indicated by dotted lines in Fig 26, the conical nose being designed for a fuselage shown in full lines in Fig. 26. It will be noted that the nose 170 comprises a shell 171 that is conical in general configuration and is reinforced by inner circumferential frame members or rings 172.

Figure 24:
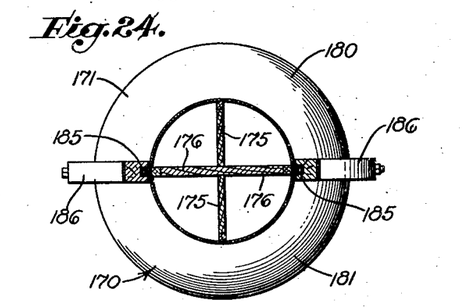
Fig. 24 is a transverse section taken as indicated by the line 24—24 of Fig. 23.

The apparatus for fabricating the fuselage nose 170 may comprise a mandrel assembly generally designated 173 consisting of radially disposed plates mounted on a base plate 174. As indicated in Fig. 24, there may be four such plates, there being two diametrically opposite plates 175 of the strength required and two diametrically opposite plates 176 that are relatively thick to serve as backing for making longitudinal joints, as will be explained later. For use with such a mandrel assembly we may employ a series of pressure rings 177 corresponding to the previously mentioned inner circumferential frame members 172.

Figures 22, 25:
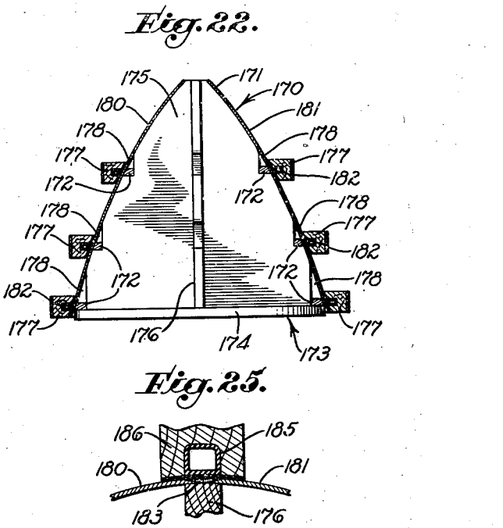
Fig. 22 is a view partly in section and partly in side elevation of an apparatus for applying the principles of the invention to the construction of a tapered nose for a fuselage, the view showing circumferential pressure rings.
Fig. 25 is an enlarged detail of Fig. 24.

The first step in the procedure is to drop the frame rings 172 onto the mandrel assembly, the mandrel assembly being provided with suitable recesses 178 to receive the frame rings. The preformed shell in two longitudinally divided sections 180 and 181 is then placed on the mandrel assembly, there being suitable glue provided along the zones of juncture with the inner frame rings. The pressure rings 177 are then placed over the shell, each of the pressure rings housing an expansile duct 182 to create radially inward pressure against the sheet material in the plane of the corresponding inner frame ring 172. Fig. 22 shows the assemblage resulting from carrying the procedure to this point, the assemblage being ready for transportation to a heating chamber to cause the glue to set. It is to be noted that the two shell sections 180 and 181 are so positioned on the mandrel assembly 173 that their lines of juncture extend along the edges of the thicker plates 176.

Figure 23:
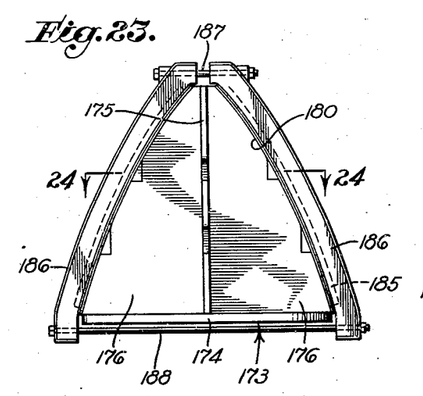
Fig. 23 is a similar view with the circumferential pressure rings replaced by longitudinal pressure members.

After the assemblage shown in Fig. 22 is removed from the heating chamber, the pressure rings 177 are removed and steps are taken to unite the longitudinal edges of the two shell sections 180 and 181. As shown in Fig. 25, an efficient joint may be made without locally thickening the shell by beveling the longitudinal edges of the shell sections to receive a correspondingly beveled connecting strip 183. After the inner surface of the connecting strip 183 is suitably coated with thermal-setting glue, the strip is placed in proper position and then subjected to pressure by an expansile duct 185 carried by a longitudinal pressure member 186. Since there are two longitudinal joints to be made in uniting the two shell sections 180 and 181, there are two longitudinal pressure members 186 and the two longitudinal pressure members may be held against the shell sections with the required rigidity by simply employing an upper interconnecting bolt 187 and a lower interconnecting bolt 188, as indicated in Fig. 23. It may be said that in the arrangement shown in Fig. 23 the pressure means for making the longitudinal joint embraces the entire assembly.

In applying the principles of our invention to the main fuselage section generally designated 190 and shown in full lines in Fig. 26, it is not necessary to employ a mandrel assembly since the inner structure of the fuselage section may advantageously be completed to an advanced stage and then internally braced to make it possible to use pressure rings for applying sheet material to the frame. In such a procedure, various fittings may be mounted on the internal structure of the fuselage while the structure is open for maximum accessibility.

Various expedients may be employed to internally brace the fuselage structure. For example, as shown in Fig. 26, the internal circumferential frame members or rings, such as the ring 191, may be temporarily braced to resist radial compression by employing a pair of semicircular plates 192 in cooperation with suitable small wedges 193. Wherever the function of a circumferential frame member is performed by a partition or bulkhead in the fuselage, any openings in the partition or bulkhead may be filled with temporary bracing elements for reinforcement. Thus the partition 195 has a plate 196 in a doorway 197, a plate 198 in a window 200, and a small plate 201 in a small opening 202, the three plates being retained by small wedges 203.

Figure 27:
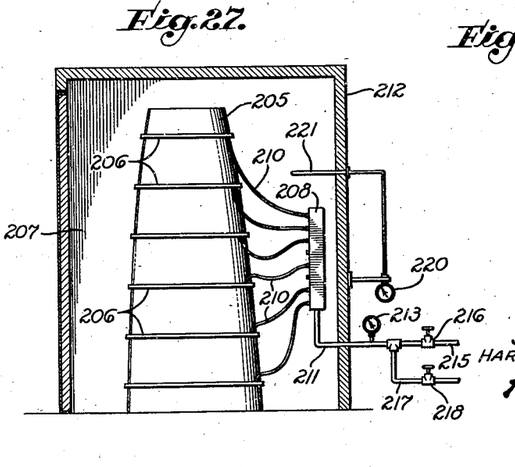
Fig. 27 is a diagrammatic view of an assembly in a heating chamber with means controlled from the exterior of the chamber for applying fluid pressure to the assembly.

After the main fuselage section of Fig. 26 is suitably braced internally in the manner indicated, glue is applied to the external surfaces of the fuselage frame, preformed shell sections are applied, and then suitable pressure rings are employed all in a manner that will be readily understood from previous discussion. Fig. 27 shows such a main fuselage section covered by sheet material forming a shell 205, the shell being embraced by a series of pressure rings 206. Each of the pressure rings 206 is provided with an expansile fluid duct for exerting radially inward pressure against the shell.

Fig. 27 shows the embraced shell 205 standing upright in a heating chamber 207 with the various pressure rings 206 connected to a suitable manifold 208 by suitable flexible tubes or hose elements 210. The manifold is shown connected to a pipe 211 that extends through the chamber wall 212 and is provided with a suitable pressure gauge 213 on the outside of the wall. The pipe 211 is connected to a high pressure pipe 215 controlled by a valve 216 and is likewise connected to a relief pipe 217 controlled by a valve 218. The operator may manipulate the two valves 216 and 218 to control pressure in the pressure rings 206 as guided by the pressure gauge 213 and may control the heat in the chamber 212 as guided by a temperature indicator 220 that is remotely controlled by a thermal-responsive element 221 in the heating chamber. One feature of this arrangement is that any tendency of fluid pressure in the pressure rings to drop by reason of thermal expansion of the pressure rings may be ascertained by simply observing the pressure gauge 213 and may be corrected by proper manipulation of the valve 216.

Figure 28:
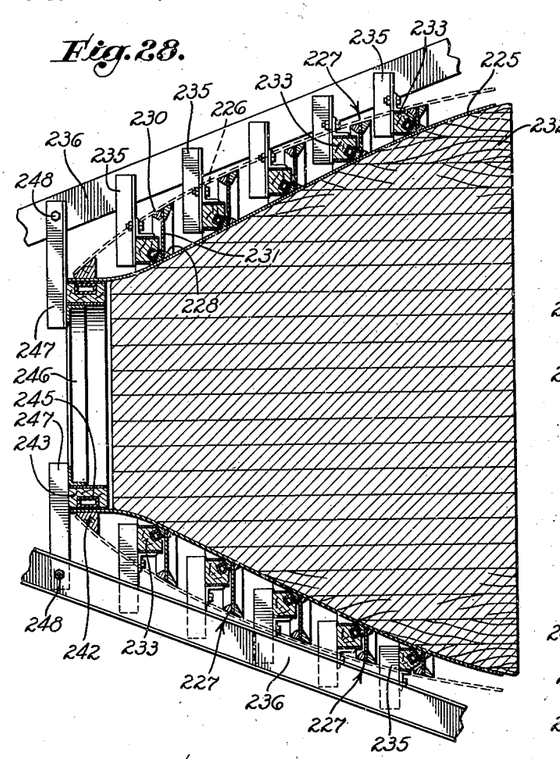
Fig. 28 is a cross section of apparatus for applying the principles of the invention to the construction of a double-walled conical structure.
Figure 29:
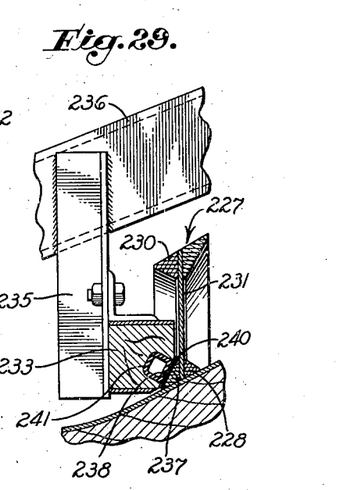
Fig. 29 is an enlarged detail of Fig. 28.
Figure 30:
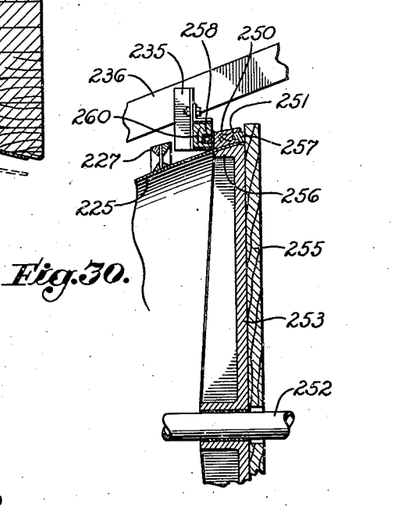
Fig. 30 is a fragmentary sectional view showing a further step in the construction of the conical structure in Fig. 28.

Figs. 28, 29, and 30 teach how our invention may be applied to the problem of forming a conical shell having numerous external circumferential frame members or rings as distinguished from internal frame members. The particular hollow structure to be formed is a double-walled conical unit to be employed as part of a so-called spinner construction associated with the airplane propellers. The configuration of the unit may be understood from Fig. 28 which shows an inner wall 225 conical in general configuration, an outer wall 226 of similar configuration indicated in dotted lines, and a plurality of circular frame members 227 that serve as annular means interconnecting the two walls. Each of the circular frame members 227 comprises an inner ring 228, an outer ring 230, and an annular web 231 interconnecting the two rings.

In the procedure for fabricating such a double-walled unit the inner wall 225 is first formed as two halves or shell sections, as heretofore suggested, and the two preformed shell sections are placed on a solid conical mandrel 232, as indicated in Fig. 28. The prefabricated circular frame members 227 are then placed in proper order over the two shells to be acted upon by a series of pressure rings generally designated 233.

Each of the pressure rings 233 is made in two semi-circular sections, as heretofore described, and each of the two sections is supported by one or more arms 235 that extend radially inwardly from surrounding frames 236, there being two such frames adapted to move apart to receive and release work therebetween.

As best shown in Fig. 29 the inner ring 228 of each of the circular frame members has an inclined face 237, and each of the pressure rings 233 has a similarly inclined face 238 for cooperation therewith. The inclined face 238 of the pressure ring 233 is provided with a rubber liner 240 back of which is an expansile fluid duct 241 of the character heretofore described. Adhesive is applied to the surfaces of juncture between the annular frame member 227 and the underlying material of the inner wall 225, and then with the pressure ring properly adjusted the expansile fluid duct 241 is placed under pressure to exert force against the inner ring of the annular frame member in a direction substantially normal to the inclined face 237 of the ring. As a result of the pressure created by the fluid duct 241, the inner wall 225 braced by the solid mandrel 232 acts as a circular wedge against which the circular frame member 227 is driven. As a result the circular frame members 227 are pressed tightly against the inner wall 225, the pressure being sustained until the intervening glue sets to make a permanent bond.

It will be noted in Fig. 28 that the smaller end of the inner wall 225 is cylindrical rather than conical. To create the required pressure for forming an adhesive bond between this cylindrical portion of the inner wall and a surrounding circumferential frame member or ring 242, we provide an inner pressure ring 243 having a fluid duct 245 for radially outward expansion. The pressure ring 243 is reinforced by a ring 246 of angle-iron and is supported by radial arms 247 that are detachably mounted by bolts 248 on the frames 236.

After fabrication is completed to the stage indicated in Fig. 28, a final ring 250 is added to the structure in the manner indicated in Fig. 30, this final ring having a rearwardly presented groove 251 that functions in the subsequent mounting of the completed unit on the airplane. In preparation for mounting the ring 250 on the inner wall 225 a special mandrel is employed comprising a spindle 252 carrying an inner member 253 and an outer member 255. The inner member 253 has a circumferential flange 256 with a conical circumferential surface complementary to the conical configuration of the inner wall 225 and the outer member 255 carries a ring 257 of a configuration complementary to the grooves 251 of the ring 250. After glue has been applied, the frame ring 250 is forced toward the mandrel ring 257 by the action of an expansile duct 258 in a pressure ring 260, the pressure ring 260 being carried by arms 235 from the surrounding frames 236.

The advantages of employing an expansile fluid duct in combination with longitudinal and circumferential pressure members may be noted as follows:

(1) Pressure for holding surfaces together may be created quickly since relatively small volumes of the pressure medium are required.

(2) Higher pressures may be created in tubes of smaller cross section than can be safely developed in pressure tanks of relatively large diameter.

(3) The rupture of an expansile duct of small cross section containing gaseous fluid under high pressure is not a serious matter, whereas the rupture of a large tank of compressible fluid under the same pressure would be a serious hazard.

(4) The employment of the expansile fluid ducts makes it possible to restrict the pressure for gluing operations to the zones of glue application. It is not necessary to place extensive areas under pressure.

(5) The employment of a number of independent fluid expansile ducts for a relatively large assembly makes it possible to place the assembly under pressure progressively. Fluid under pressure may be admitted to the individual expansile ducts as fast as the corresponding pressure rings or other pressure members are fixed in place.

(6) The employment of the expansile fluid ducts to create pressure at the zones of juncture makes it possible to heat the pressure fluid and thereby simultaneously transfer heat to the zones of juncture.

(7) The fluid pressure in the expansile ducts may be measured and controlled at a remote station. Thus an assembly may be placed in a heating chamber and the pressure in the various expansile ducts of the assembly may be controlled by an operator outside the heating chamber.

(8) When an assembly including a number of expansile ducts is placed in a heating chamber, the rise in temperature may tend to cause the pressure rings or other pressure members to expand, but such a tendency is compensated at least in part by the tendency for the rise in temperature to cause the pressure fluid to expand simultaneously.

(9) If the expansion of a pressure ring does cause a drop in the fluid pressure notwithstanding the increase in temperature of the fluid, in operator at a remote point may observe the drop in pressure and restore the pressure by supplying additional fluid to the expansile ducts.

(10) A circumferential pressure duct does not cause friction or tend to creep circumferentially in the manner of a metal band that is placed under tension to create the desired radial pressure.

(11) The radial pressure created by a circumferential pressure duct can be measured accurately, whereas the radial pressure created by a circumferential member cannot in practice be measured.

(12) Because of friction a circumferential tension member does not create uniform radial pressure, whereas a circumferential pressure duct exerts the same radial pressure at all circumferential points.

(13) A circumferential tension member cannot be used in a satisfactory manner for creating radial pressure on an elliptical or oval body, because nearly all of the radial pressure will be exerted across the major cross-sectional axis of the body. A circumferential pressure duct in combination with a rigid noncircular pressure member or girth means around the body may be employed to produce substantially the same pressure across the minor cross-sectional axis as across the major cross-sectional axis of the non-circular body.

(14) All of the expansile ducts of a jig assembly may be interconnected or connected to a common source or manifold, thereby making all of the compressed fluid continuous so that a minor leak at any point will not cause serious local lowering of pressure.

(15) The tightening of a circumferential tension means to attain adequate radial compression requires tedious and time-consuming manipulation, whereas pressure may be created immediately in a pressure duct by merely turning a valve.

The description herein in specific detail of the preferred practices of our invention will suggest to those skilled in the art various changes and modifications in the apparatus under our basic inventive concept, and we reserve the right to all such changes and modifications that lie within the scope of our appended claims.

We claim as our invention:

1. In an apparatus for assembling relatively long hollow structures having wall material in sheet form reinforced by internal frame members, the combination of: a jig assembly of a length greater than the hollow structure for positioning said frame members to receive said sheet material with intervening adhesive; at least three supporting means for said jig assembly, some of said supporting means being movable out of contact with the jig assembly to permit circumferential frame members to be moved onto and along the jig assembly from one end thereof for distribution of said frame members therealong; means for expanding said jig assembly outward to reinforce said frame members against inward pressure and for subsequently collapsing said jig assembly to permit subsequent withdrawal; and means for embracing the assembly of frame members with surrounding sheet material to press the sheet material inwardly against the frame members while said adhesive sets.

2. In a collapsible jig for retaining in axially-spaced position a plurality of circumferential frame members preparatory to covering same with a wall material, the combination of: a core; a pair of mandrel elements diametrically opposite the axis of said core and providing notches for reception of said circumferential frame members; means between said core and said mandrel elements for moving at least one of said mandrel elements outward to a position in which said frame members are in said notches; a pair of plates disposed within each frame member and extending substantially transverse to said axis of said core, each plate providing an outer periphery conforming to the inner periphery of approximately one-half of the circumferential frame member; and a withdrawable wedge means for spreading the plates of each pair into pressural engagement with the surrounding frame member.

WILLIAM L. LEWIS.
FREDERIC C. PAHL.

REFERENCES CITED

The following references are of record in the file of this patent:

UNITED STATES PATENTS

| Number | Name | Date |
|---|---|---|
| 784,909 | Westerling | Mar. 14, 1905 |
| 1,112,686 | Cunnius | Oct. 6, 1914 |
| 1,271,386 | Tarbox | July 2, 1918 |
| 1,312,615 | Cooper | Aug. 12, 1919 |
| 1,361,835 | Delage | Dec. 14, 1920 |
| 1,363,433 | Phipps | Dec. 28, 1920 |
| 1,394,726 | Gilmore | Oct. 25, 1921 |
| 1,425,113 | Loughead | Aug. 8, 1922 |
| 1,618,536 | Junkers | Feb. 22, 1927 |
| 1,720,968 | Schmidt | July 16, 1929 |
| 1,806,861 | Owen | May 26, 1931 |
| 1,822,270 | Bunch | Sept. 8, 1931 |
| 1,871,982 | Geyer | Aug. 16, 1932 |
| 1,884,144 | Norquist | Oct. 25, 1932 |
| 1,932,430 | Weyerbacher | Oct. 31, 1933 |
| 1,954,183 | Schlesinger | Apr. 10, 1934 |
| 2,090,415 | Homey | Aug. 17, 1937 |
| 2,168,280 | Klemm | Aug. 1, 1939 |
| 2,252,040 | Fischer-Schumtz | Aug. 12, 1941 |
| 2,276,004 | Vidal et al. | Mar. 10, 1942 |
| 2,279,820 | Hamilton | Apr. 14, 1942 |
| 2,287,320 | Mitchell | June 23, 1942 |
| 2,308,453 | Potchen et al. | Jan. 12, 1943 |
| 2,322,962 | Dickson et al. | June 29, 1943 |

FOREIGN PATENTS

| Number | Country | Date |
|---|---|---|
| 65,208 | Germany | Nov. 1, 1892 |
| 406,005 | Great Britain | Feb. 15, 1934 |
| 444,462 | Great Britain | Mar. 20, 1936 |
| 456,503 | Great Britain | Nov. 10, 1936 |
| 494,885 | Great Britain | Nov. 3, 1938 |